(12) United States Patent
Shinmura et al.

(10) Patent No.: US 7,245,094 B2
(45) Date of Patent: Jul. 17, 2007

(54) POWER OUTPUT APPARATUS, MOTOR VEHICLE EQUIPPED WITH POWER OUTPUT APPARATUS, AND CONTROL METHOD OF POWER OUTPUT APPARATUS

(75) Inventors: Osamu Shinmura, Toyota (JP); Tatsuyuki Uechi, Anjo (JP)

(73) Assignees: Toyota Jidosha Kabushiki Kaisha, Toyota (JP); Aisin Aw Co., Ltd., Anjo (JP)

( * ) Notice: Subject to any disclaimer, the term of this patent is extended or adjusted under 35 U.S.C. 154(b) by 0 days.

(21) Appl. No.: 11/330,970

(22) Filed: Jan. 13, 2006

(65) Prior Publication Data

US 2006/0175995 A1 Aug. 10, 2006

(30) Foreign Application Priority Data

Jan. 13, 2005 (JP) ............................. 2005-006249

(51) Int. Cl.
*H02P 5/00* (2006.01)
*B60K 6/02* (2006.01)
*B06L 11/00* (2006.01)

(52) U.S. Cl. ..................... 318/139; 318/52; 318/471; 318/587; 180/65.2; 701/22

(58) Field of Classification Search ............. 318/139, 318/587; 361/71; 290/40 C; 388/804; 700/19; 714/48
See application file for complete search history.

(56) References Cited

U.S. PATENT DOCUMENTS

| | | | | |
|---|---|---|---|---|
| 5,376,868 | A * | 12/1994 | Toyoda et al. | 318/587 |
| 5,805,797 | A * | 9/1998 | Sato et al. | 714/48 |
| 6,563,230 | B2 * | 5/2003 | Nada | 290/40 C |
| 6,654,648 | B2 * | 11/2003 | Nada et al. | 700/19 |
| 6,784,563 | B2 * | 8/2004 | Nada | 290/40 C |
| 2001/0048226 | A1 * | 12/2001 | Nada | 290/40 C |
| 2003/0102673 | A1 * | 6/2003 | Nada | 290/40 C |
| 2006/0007615 | A1 * | 1/2006 | Ochiai et al. | 361/71 |

(Continued)

FOREIGN PATENT DOCUMENTS

JP A-05-115106 5/1993

(Continued)

*Primary Examiner*—Paul Ip
(74) *Attorney, Agent, or Firm*—Oliff & Berridge, PLC

(57) ABSTRACT

In the vehicle of the invention, when the temperature of an inverter 42 for driving a motor MG2 linked to front wheels 62a and 62b reaches or exceeds a preset restriction start temperature, the drive control of the invention controls the inverters 42 and 43 to gradually decrease the output torque of the motor MG2 simultaneously with a gradual increase in output torque of a motor MG3, which is linked to rear wheels 64a and 64b. Such torque control ensures output of a torque demand required for the vehicle. When the temperature of the inverter 42 reaches or exceeds a preset frequency switchover temperature, which is higher than the restriction start temperature, the drive control of the invention controls the inverters 42 and 43 to lower a switching frequency of transistors T1 to T6 in the inverter 42 and to ensure output of the torque demand. Such drive control effectively relieves the load of the inverter 42, while decreasing the frequency of lowering the switching frequency of the inverter 42. This arrangement thus desirably attains both prevention of overheat of the inverter 42 and reduces the switching noise.

9 Claims, 12 Drawing Sheets

U.S. PATENT DOCUMENTS

2006/0018636 A1* 1/2006 Watanabe et al. ........... 388/804

FOREIGN PATENT DOCUMENTS

| JP | A-07-194094 | 7/1995 |
| JP | A-09-121595 | 5/1997 |
| JP | A-2002-010668 | 1/2002 |
| JP | A 2006-115664 | 4/2006 |

* cited by examiner

POWER OUTPUT APPARATUS, MOTOR VEHICLE EQUIPPED WITH POWER OUTPUT APPARATUS, AND CONTROL METHOD OF POWER OUTPUT APPARATUS

BACKGROUND OF THE INVENTION

1. Field of the Invention

The present invention relates to a power output apparatus that outputs power for driving, a motor vehicle equipped with the power output apparatus, and a control method of the power output apparatus.

2. Description of the Prior Art

One proposed power output apparatus is mounted on an electric vehicle and has a motor driven by an inverter (see, for example, Japanese Patent Laid-Open Gazette No. H05-115106). When the temperature of power elements included in the inverter is sufficiently low, this prior art power output apparatus raises the carrier frequency for switching of the power elements to reduce the switching-induced electromagnetic noise. When the temperature of the power elements increases to a certain high level, the power output apparatus lowers the carrier frequency for switching of the power elements to depress a further temperature rise of the power elements. When the temperature of the power elements further increase to a higher level, the power output apparatus restricts the output of the inverter to prevent overheat of the power elements.

SUMMARY OF THE INVENTION

This prior art power output apparatus sets the carrier frequency to a lower level when the temperature of the power elements increases to the certain high level. Switching of the power elements at the low carrier frequency undesirably causes the electromagnetic noise. The restricted output of the inverter prevents overheat of the power elements but does not satisfy a power demand required for the vehicle. The non-fulfillment of the power demand undesirably lowers the driving performances on a start of the vehicle or in a hill drive state.

The power output apparatus of the invention, the motor vehicle equipped with the power output apparatus, and the control method of the power output apparatus thus aim to eliminate the drawbacks of the prior art power output apparatus and to attain both optimum operations of driving circuits and reduction of driving noise of the driving circuits. The power output apparatus of the invention, the motor vehicle equipped with the power output apparatus, and the control method of the power output apparatus also aim to satisfy a power demand. The power output apparatus of the invention, the motor vehicle equipped with the power output apparatus, and the control method of the power output apparatus further aim to prevent overheat of the driving circuits.

In order to attain at least part of the above and the other related objects, the power output apparatus of the invention, the motor vehicle equipped with the power output apparatus, and the control method of the power output apparatus have the configurations discussed below.

The present invention is directed to a power output apparatus that outputs power for driving, and the power output apparatus includes: multiple motors that are capable of outputting power for driving; multiple driving circuits that individually have switching elements and respectively drive the multiple motors by switching operations of the switching elements; a power demand setting module that sets a power demand in response to an operator's operation; and a control module that, when all the multiple driving circuits are in a normal state, drives and controls the multiple driving circuits to ensure output of a power equivalent to the set power demand from the multiple motors, while when one of the multiple driving circuits is in an abnormal state, driving and controlling the multiple driving circuits to restrict output of the power from a motor driven by the driving circuit in the abnormal state, prior to restriction of a switching frequency of the switching elements included in the driving circuit in the abnormal state and to ensure output of the power equivalent to the set power demand from the multiple motors.

When all the multiple driving circuits for driving the multiple motors are in the normal state, the power output apparatus of the invention drives and controls the multiple driving circuits to ensure output of a power equivalent to the set power demand from the multiple motors. When one of the multiple driving circuits is in the abnormal state, the power output apparatus of the invention drives and controls the multiple driving circuits to restrict the output of the power from the motor driven by the driving circuit in the abnormal state, prior to restriction of the switching frequency of the switching elements included in the driving circuit in the abnormal state and to ensure output of the power equivalent to the set power demand from the multiple motors. Such control effectively relieves the load of the driving circuit in the abnormal state, while reducing the switching noise of the switching elements included in the driving circuit in the abnormal state. This arrangement desirably attains both optimum operations of the driving circuits and reduction of the driving noise of the driving circuits. This arrangement also satisfies the power demand, regardless of the state of the multiple driving circuits.

In one preferable embodiment of the power output apparatus of the invention, the control module drives and controls a driving circuit heated to at least a preset first temperature among the multiple driving circuits, as the driving circuit in the abnormal state. In this embodiment, when one of the multiple driving circuits is heated to the preset first temperature, the control module drives and controls the multiple driving circuits to restrict output of the power from a motor driven by the driving circuit heated to the preset first temperature and to ensure output of the power equivalent to the set power demand from the multiple motors, while when one of the multiple driving circuits is heated to a preset second temperature, which is higher than the preset first temperature, the control module driving and controlling the multiple driving circuits to restrict the switching frequency of the switching elements included in at least the driving circuit heated to the preset second temperature and to ensure output of the power equivalent to the set power demand from the multiple motors.

In another preferable embodiment of the power output apparatus of the invention, the control module drives and controls the multiple driving circuits to enable a motor driven by a driving circuit in the normal state to compensate for an insufficiency of the power caused by the restriction of the output of the power from the motor driven by the driving circuit in the abnormal state. In one preferable application of the power output apparatus of this embodiment, the control module drives and controls the multiple driving circuits to gradually decrease the power output from the motor driven by the driving circuit in the abnormal state, simultaneously with a gradual increase in power output from the motor driven by the driving circuit in the normal state. Such control desirably prevents the occurrence of shock in the process of decreasing the power output from the motor driven by the driving circuit in the abnormal state simultaneously with the increase in power output from the motor driven by the driving circuit in the normal state. In another preferable application of the power output apparatus of this embodiment, when the motor driven by the driving circuit in the normal state fails to compensate for the insufficiency of the power caused by the restriction of output of the power from the motor driven by the driving circuit in the abnormal state in a preset power range, the control module drives and controls the multiple driving circuits to restrict the switching frequency of the switching elements included in at least the driving circuit in the abnormal state and to ensure output of the power equivalent to the set power demand from the multiple motors. This arrangement desirably prevents excess load of the driving circuit in the abnormal state.

In one preferable structure of the invention, the power output apparatus further includes an internal combustion engine that outputs power for driving. When one of the multiple driving circuits is in the abnormal state under operation of the internal combustion engine, the control module drives and controls the multiple driving circuits to restrict the switching frequency of the switching elements included in at least the driving circuit in the abnormal state and to ensure output of the power equivalent to the set power demand from the multiple motors. When the operation noise of the internal combustion engine expects to reduce the effects of the switching noise of the switching elements, the restriction of the switching frequency relieves the load of the driving circuit in the abnormal state.

The present invention is directed to a motor vehicle including: multiple motors including a first motor that is capable of outputting power to first wheels and a second motor that is capable of outputting power to second wheels, which are different from the first wheels; multiple driving circuits including a first driving circuit and a second driving circuit that individually have switching elements and respectively drive the first motor and the second motor by switching operations of the switching elements; a power demand setting module that sets a power demand in response to an operator's operation; and a control module that, when all the multiple driving circuits are in a normal state, drives and controls the multiple driving circuits to ensure output of a power equivalent to the set power demand from the multiple motors, while when the first driving circuit among the multiple driving circuits is in an abnormal state, driving and controlling the multiple driving circuits to restrict output of the power from the first motor driven by the first driving circuit, prior to restriction of a switching frequency of the switching elements included in the first driving circuit and to enable the second motor to compensate for an insufficiency of the power caused by the restriction, thus ensuring output of the power equivalent to the set power demand from the multiple motors.

The motor vehicle of the invention has the multiple driving circuits including the first driving circuit and the second driving circuit and functioning to drive the multiple motors including the first motor and the second motor. When all the multiple driving circuits are in the normal state, the motor vehicle drives and controls the multiple driving circuits to ensure output of the power equivalent to the set power demand from the multiple motors. When the first driving circuit among the multiple driving circuits is in the abnormal state, the motor vehicle of the invention drives and controls the multiple driving circuits to restrict output of the power from the first motor driven by the first driving circuit, prior to restriction of the switching frequency of the switching elements included in the first driving circuit and to enable the second motor to compensate for the insufficiency of the power caused by the restriction, thus ensuring output of the power equivalent to the set power demand from the multiple motors. Such control effectively relieves the load of the first driving circuit in the abnormal state, while reducing the switching noise of the switching elements included in the first driving circuit in the abnormal state. This arrangement desirably attains both optimum operations of the driving circuits and reduction of the driving noise of the driving circuits. This arrangement also satisfies the power demand, regardless of the state of the multiple driving circuits.

The present invention is directed to a control method of a power output apparatus having: multiple motors that are capable of outputting power for driving; and multiple driving circuits that individually have switching elements and respectively drive the multiple motors by switching operations of the switching elements, and the control method including the steps of: (a) setting a power demand in response to an operator's operation; and (b) when all the multiple driving circuits are in a normal state, driving and controlling the multiple driving circuits to ensure output of a power equivalent to the set power demand from the multiple motors, while when one of the multiple driving circuits is in an abnormal state, driving and controlling the multiple driving circuits to restrict output of the power from a motor driven by the driving circuit in the abnormal state, prior to restriction of a switching frequency of the switching elements included in the driving circuit in the abnormal state and to ensure output of the power equivalent to the set power demand from the multiple motors.

When all the multiple driving circuits for driving the multiple motors are in the normal state, the control method of the power output apparatus of the invention drives and controls the multiple driving circuits to ensure output of a power equivalent to the set power demand from the multiple motors. When one of the multiple driving circuits is in the abnormal state, the control method of the power output apparatus of the invention drives and controls the multiple driving circuits to restrict the output of the power from the motor driven by the driving circuit in the abnormal state, prior to restriction of the switching frequency of the switching elements included in the driving circuit in the abnormal state and to ensure output of the power equivalent to the set power demand from the multiple motors. Such control effectively relieves the load of the driving circuit in the abnormal state, while reducing the switching noise of the switching elements included in the driving circuit in the abnormal state. This arrangement desirably attains both optimum operations of the driving circuits and reduction of the driving noise of the driving circuits. This arrangement also satisfies the power demand, regardless of the state of the multiple driving circuits.

In one preferable embodiment of the control method of the invention, the step (b) drives and controls a driving circuit heated to at least a preset first temperature among the multiple driving circuits, as the driving circuit in the abnormal state. In this embodiment, when one of the multiple driving circuits is heated to the preset first temperature, the step (b) drives and controls the multiple driving circuits to restrict output of the power from a motor driven by the driving circuit heated to the preset first temperature and to ensure output of the power equivalent to the set power demand from the multiple motors, while when one of the multiple driving circuits is heated to a preset second temperature, which is higher than the preset first temperature, the step (b) driving and controlling the multiple driving circuits to restrict the switching frequency of the switching elements included in at least the driving circuit heated to the preset second temperature and to ensure output of the power equivalent to the set power demand from the multiple motors.

In another preferable embodiment of the control method of the invention, the step (b) drives and controls the multiple driving circuits to enable a motor driven by a driving circuit in the normal state to compensate for an insufficiency of the power caused by the restriction of the output of the power from the motor driven by the driving circuit in the abnormal state. In one preferable application of the control method of this embodiment, the step (b) drives and controls the multiple driving circuits to gradually decrease the power output from the motor driven by the driving circuit in the abnormal state, simultaneously with a gradual increase in power output from the motor driven by the driving circuit in the normal state. Such control desirably prevents the occurrence of shock in the process of decreasing the power output from the motor driven by the driving circuit in the abnormal state simultaneously with the increase in power output from the motor driven by the driving circuit in the normal state. In another preferable application of the control method of this embodiment, when the motor driven by the driving circuit in the normal state fails to compensate for the insufficiency of the power caused by the restriction of output of the power from the motor driven by the driving circuit in the abnormal state in a preset power range, the step (b) drives and controls the multiple driving circuits to restrict the switching frequency of the switching elements included in at least the driving circuit in the abnormal state and to ensure output of the power equivalent to the set power demand from the multiple motors. This arrangement desirably prevents excess load of the driving circuit in the abnormal state.

In another preferable embodiment of the control method of the invention, the power output apparatus includes an internal combustion engine that outputs power for driving, and when one of the multiple driving circuits is in the abnormal state under operation of the internal combustion engine, the step (b) drives and controls the multiple driving circuits to restrict the switching frequency of the switching elements included in at least the driving circuit in the abnormal state and to ensure output of the power equivalent to the set power demand from the multiple motors. When the operation noise of the internal combustion engine expects to reduce the effects of the switching noise of the switching elements, the restriction of the switching frequency relieves the load of the driving circuit in the abnormal state.

DESCRIPTION OF THE PREFERRED EMBODIMENTS

Figure 1:
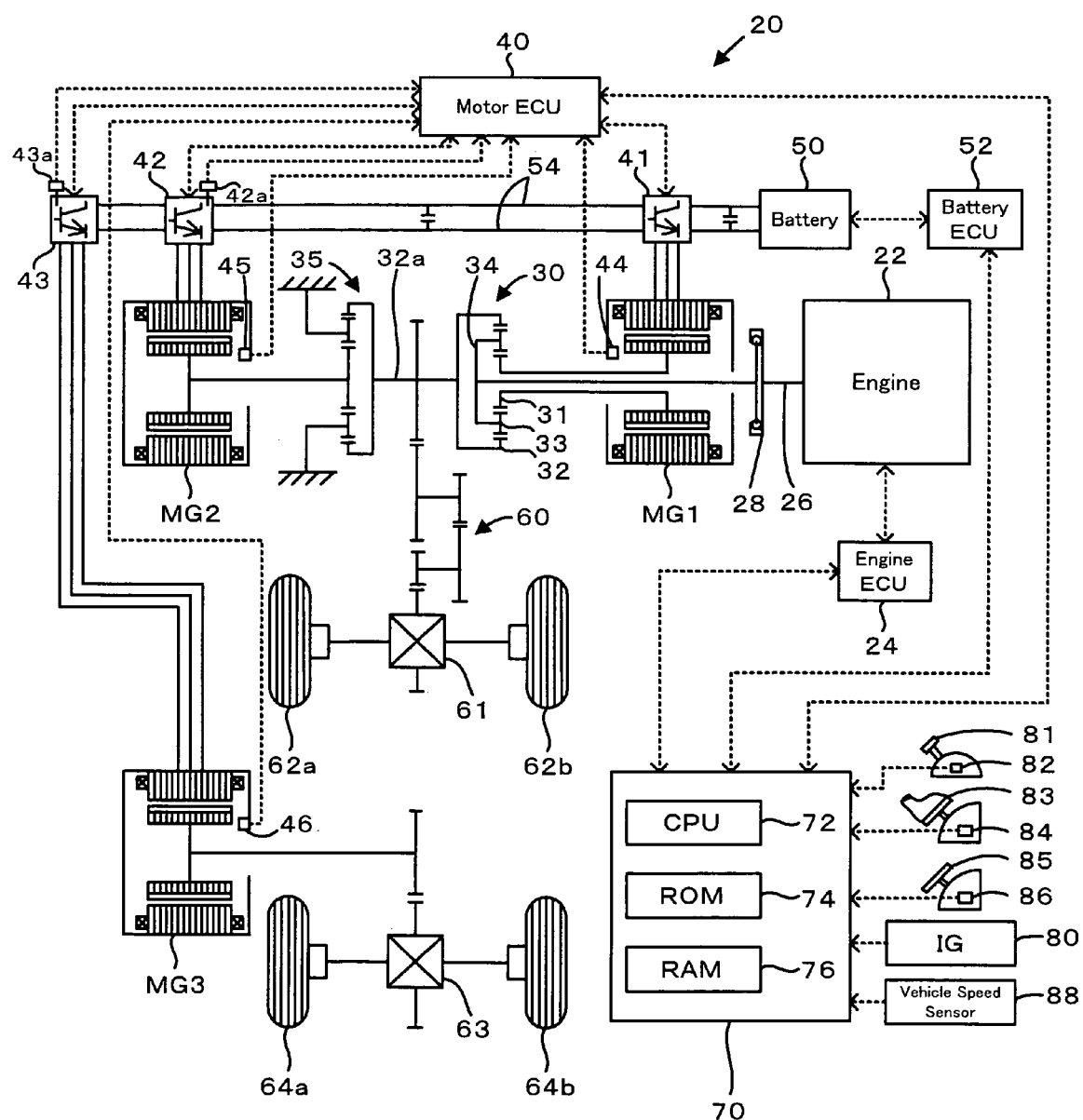
FIG. 1 schematically illustrates the configuration of a hybrid vehicle equipped with a power output apparatus in one embodiment of the invention.

One mode of carrying out the invention is described below as a preferred embodiment. FIG. 1 schematically illustrates the configuration of a hybrid vehicle 20 equipped with a power output apparatus in one embodiment of the invention. As illustrated, the hybrid vehicle 20 of the embodiment includes an engine 22, a three shaft-type power distribution integration mechanism 30 that is linked to a crankshaft 26 or an output shaft of the engine 22 via a damper 28, a motor MG1 that is connected to the power distribution integration mechanism 30 and has power generation capability, a motor MG2 that is connected to the power distribution integration mechanism 30 and is linked via a reduction gear 35 to a ring gear shaft 32a or a drive shaft coupled with front wheels 62a and 62b via a gear mechanism 60 and a differential gear 61, a motor MG3 that is linked to rear wheels 64a and 64b via a differential gear 63, and a hybrid electronic control unit 70 that controls the whole operations of the power output apparatus.

The engine 22 is an internal combustion engine that uses a hydrocarbon fuel, such as gasoline or light oil, to output power. An engine electronic control unit (hereafter referred to as engine ECU) 24 receives signals from diverse sensors that detect operating conditions of the engine 22, and takes charge of operation control of the engine 22, for example, fuel injection control, ignition control, and intake air flow regulation. The engine ECU 24 communicates with the hybrid electronic control unit 70 to control operations of the engine 22 in response to control signals transmitted from the hybrid electronic control unit 70 while outputting data relating to the operating conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 62a and 62b via the gear mechanism 60, and the differential gear 61 from ring gear shaft 32a.

Figure 2:
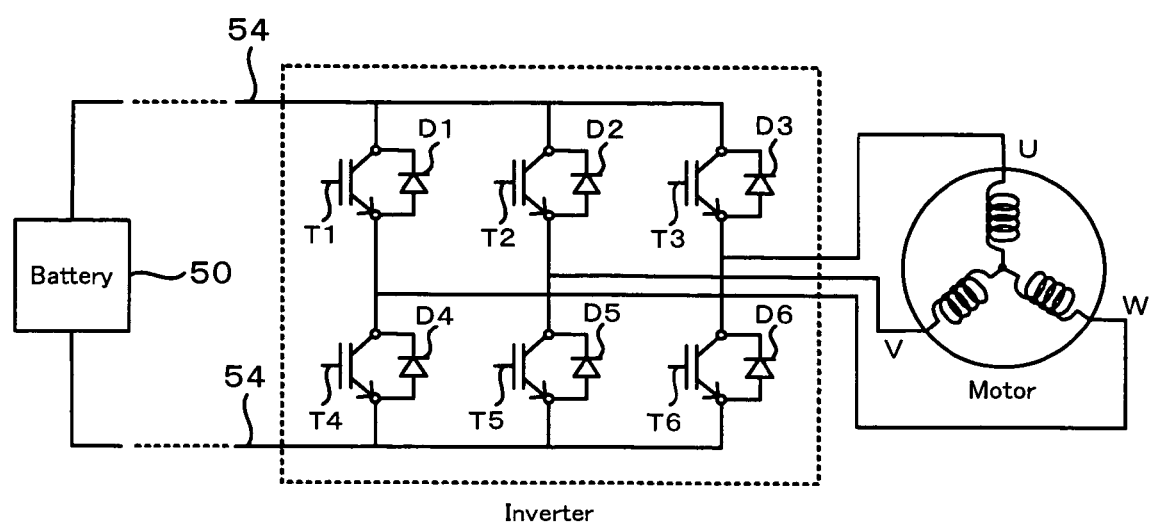
FIG. 2 schematically illustrates the structure of one inverter included in the power output apparatus of the embodiment.

The motors MG1, MG2, and MG3 are constructed as known synchronous motor generators that may be actuated both as a generator and as a motor. The motors MG1, MG2, and MG3 transmit electric powers to and from a battery 50 via corresponding inverters 41, 42, and 43. FIG. 2 schematically illustrates the structure of an inverter. The inverters 41, 42, and 43 have an identical structure, and the illustrated structure of FIG. 2 is applied to all the inverters 41, 42, and 43. As illustrated, each of the inverters 41, 42, and 43 has six transistors T1 to T6 and six diodes D1 to D6, which are inversely connected in parallel to the respective transistors T1 to T6. The transistors T1 to T6 are arranged in pairs as a source and a sink to a positive bus and a negative bus of the inverters 41, 42, and 43. Each phase of three-phase coils (U, V, and W phases) in a motor is linked to a connection point of each transistor pair. Regulation of the rate of the ON time of the respective transistor pairs forms a rotating magnetic field to drive and rotate the motor. Power lines 54 connecting the respective inverters 41, 42, and 43 with the battery 50 are structured as the common positive bus and the common negative bus shared by the inverters 41, 42, and 43. Such connection enables electric power generated by any one of the motors MG1, MG2, and MG3 to be consumed by another one of the motors MG1, MG2, and MG3. The battery 50 may thus be charged with surplus electric power generated by any of the motors MG1, MG2, and MG3, while being discharged to supplement insufficient electric power. The battery 50 is neither charged nor discharged, when the input and output of electric powers are balanced among the motors MG1, MG2 and MG3. All the motors MG1, MG2, and MG3 are driven and controlled by a motor electronic control unit 40 (hereafter referred to as motor ECU 40). The motor ECU 40 inputs signals required for driving and controlling the motors MG1, MG2, and MG3, for example, rotational positions of rotors in the motors MG1, MG2, and MG3 from rotational position detection sensors 44, 45, and 46, phase currents to be applied to the motors MG1, MG2, and MG3 from current sensors (not shown), and inverter temperatures Tinv2 and Tinv3 measured by temperature sensors 42a and 43a as the temperatures of the inverters 42 and 43 for driving the motors MG2 and MG3. The motor ECU 40 outputs switching control signals to the inverters 41, 42, and 43. The motor ECU 40 establishes communication with the hybrid electronic control unit 70 to drive and control the motors MG1, MG2, and MG3 in response to control signals received from the hybrid electronic control unit 70, while outputting data regarding the driving conditions of the motors MG1, MG2, and MG3 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment having the above construction sets a torque demand as a required vehicle output corresponding to the given vehicle speed V and the given accelerator opening Acc (equivalent to the driver's depression amount of the accelerator pedal 83), and drives and controls the engine 22 and the motors MG1, MG2, and MG3 to ensure output of a power demand equivalent to the preset torque demand. There are several drive control modes of the engine 22 and the motors MG1, MG2, and MG3. In a torque conversion drive mode, while the engine 22 is driven and controlled to output a required level of power corresponding to the power demand, the motors MG1, MG2, and MG3 are driven and controlled to enable all the output power of the engine 22 to be subjected to torque conversion for power output by the power distribution integration mechanism 30, the motor MG1, and either or both of the motors MG2 and MG3. In a charge-discharge drive mode, the engine 22 is driven and controlled to output a required level of power corresponding to the sum of the power demand and electric power used to charge the battery 50 or discharged from the battery 50. The motors MG1, MG2, and MG3 are driven and controlled to enable all or part of the output power of the engine 22, which is equivalent to the power demand with charge or discharge of the battery 50, to be subjected to torque conversion for power output by the power distribution integration mechanism 30, the motor MG1, and either or both of the motors MG2 and MG3. In a motor drive mode, either or both of the motors MG2 and MG3 are driven and controlled to ensure output of a required level of power corresponding to the power demand, while the engine 22 stops.

Figure 3:
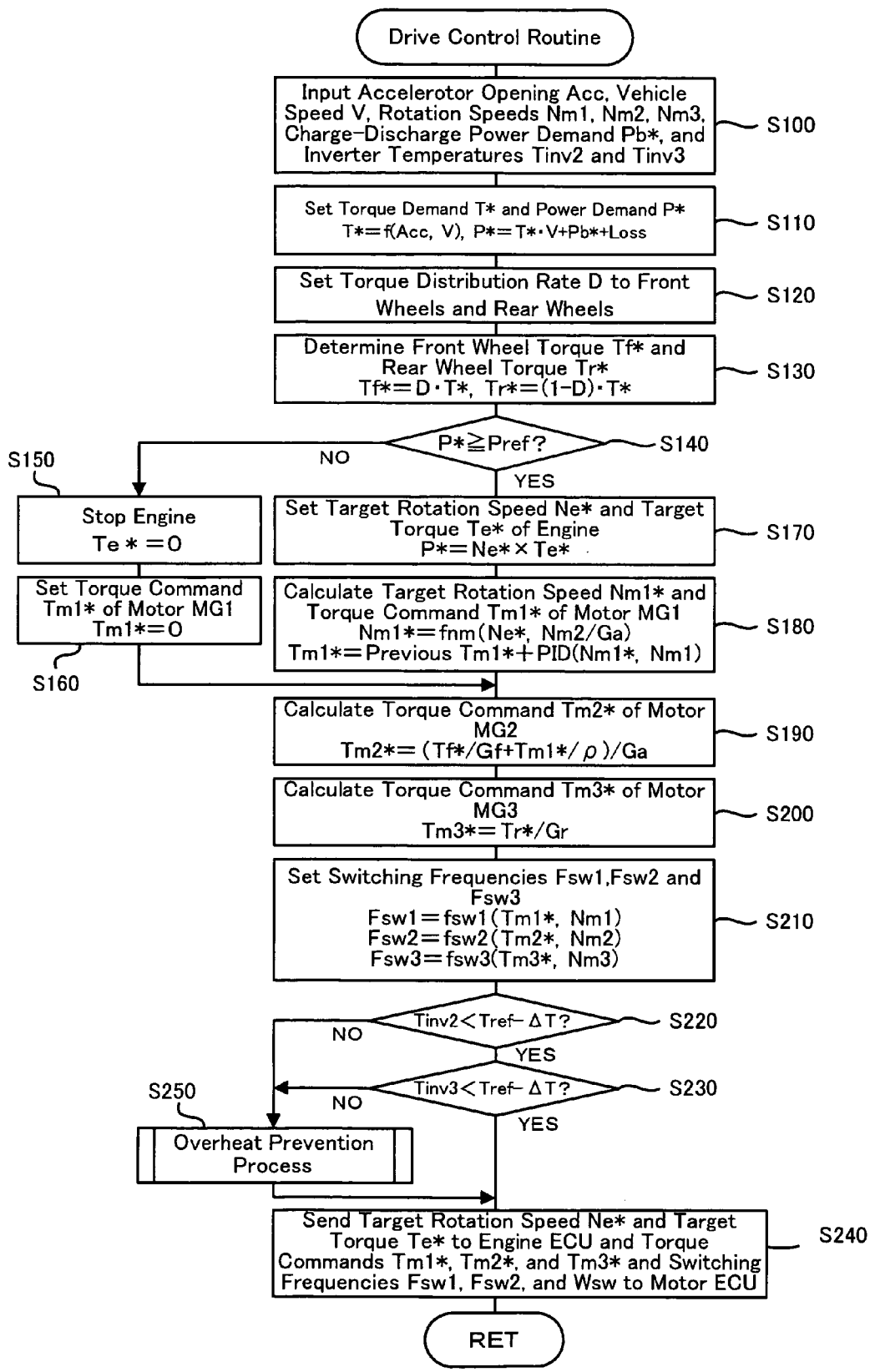
FIG. 3 is a flowchart showing a drive control routine executed by a hybrid electronic control unit included in the hybrid vehicle of the embodiment.

The description now regards the operations of the hybrid vehicle 20 of the embodiment having the configuration discussed above. FIG. 3 is a flowchart showing a drive control routine executed by the hybrid electronic control unit 70 in the hybrid vehicle 20 of the embodiment. This routine is carried out repeatedly at preset time intervals (for example, at every 8 msec).

In the drive control routine, the CPU 72 of the hybrid electronic control unit 70 first inputs various data required for control, that is, the accelerator opening Acc from the accelerator pedal position sensor 84, the vehicle speed V from the vehicle speed sensor 88, rotation speeds Nm1, Nm2, and Nm3 of the motors MG1, MG2, and MG3, a charge-discharge power demand Pb* of the battery 50, and the inverter temperatures Tinv2 and Tinv3 of the inverters 42 and 43 (step S100). The rotation speeds Nm1, Nm2, and Nm3 of the motors MG1, MG2, and MG3 are computed from the rotational positions of the respective rotors in the motors MG1, MG2, and MG3 detected by the rotational position detection sensors 44, 45, and 46 and are received from the motor ECU 40 by communication. The charge-discharge power demand Pb* of the battery 50 is set according to a charge discharge power demand setting routine (not shown). The charge discharge power demand setting routine inputs a remaining charge or current state of charge SOC of the battery 50 from the battery ECU 52 by communication and sets the charge-discharge power demand Pb* to increase a discharge power level with an increase in current state of charge SOC that exceeds a preset level and to increase a charge power level with a decrease in current state of charge SOC that is below the preset level. The inverter temperatures Tinv2 and Tinv3 are measured by the temperature sensors 42a and 43a and are input from the motor ECU 40 by communication.

Figure 4:
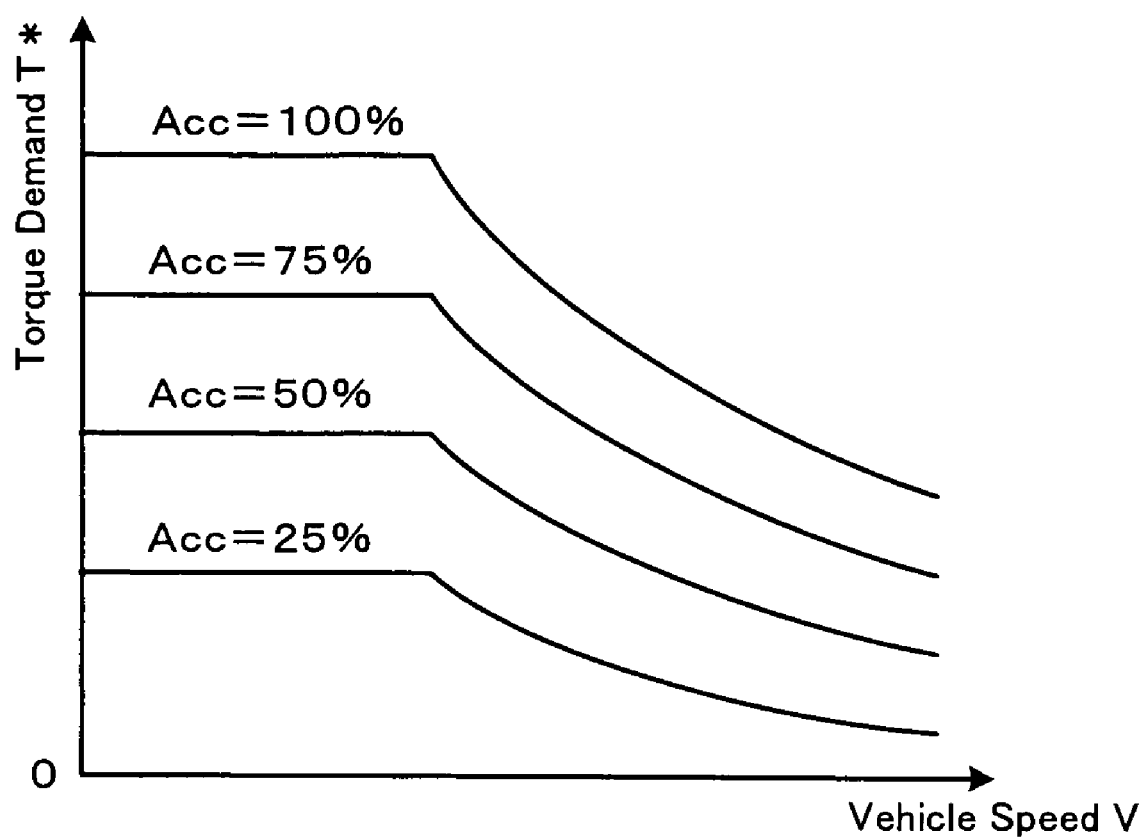
FIG. 4 shows one example of a torque demand setting map.

After the data input, the CPU 72 sets a torque demand T* and a power demand P* required for the hybrid vehicle 20, based on the input accelerator opening Acc and the input vehicle speed V (step S110). A concrete procedure of setting the torque demand T* in this embodiment stores in advance variations in torque demand T* against the accelerator opening Acc and the vehicle speed V as a torque demand setting map in the ROM 74 and reads the torque demand T* corresponding to the given accelerator opening Acc and the given vehicle speed V from this torque demand setting map. One example of the torque demand setting map is shown in FIG. 4. The power demand P* is calculated as the sum of the product of the torque demand T* and the vehicle speed V, the charge-discharge power demand Pb* to be charged into or discharged from the battery 50, and a potential loss.

The CPU 72 subsequently sets a distribution rate D to distribute the torque demand T* to the front wheels 62a and 62b and to the rear wheels 64a and 64b (step S120). The distribution rate D is set as a ratio of an output torque to the front wheels 62a and 62b to the torque demand T* and is varied in a range of 1 to 0 according to the driving conditions of the hybrid vehicle 20. For example, in an ordinary drive state, the distribution rate D is set equal to 1.0 to enable torque output only to the front wheels 62a and 62b. In a hill drive state or on a start of the hybrid vehicle 20, the distribution rate D is set equal to 0.5 or 0.6 to enable torque output to both the front wheels 62a and 62b and the rear wheels 64 and 64b. On the occurrence of a skid of either the front wheels 62a and 62b or the rear wheels 64a and 64b, the distribution rate D is adjusted to decrease the ratio of output torque to the wheels with the skid and to increase the ratio of output torque to the wheels without the skid. After setting the distribution rate D, the CPU 72 multiples the torque demand T* by the set distribution rate D to determine a front wheel torque Tf* to be output to the front wheels 62a and 62b and multiplies the torque demand T* by a difference (1−D), which is obtained by subtracting the set distribution rate D from '1', to determine a rear wheel torque Tr* to be output to the rear wheels 64a and 64b (step S130).

The CPU 72 then determines whether the calculated power demand P* is equal to or higher than a preset reference power level Pref (step S140). The reference power level Pref defines an efficient operation range of the engine 22 and depends upon the engine 22. When the calculated power demand P* is lower than the preset reference power level Pref (in the case of a negative answer at step S140), the CPU 72 identifies an inefficient operation of the engine 22. The CPU 72 accordingly sets the value '0' to a target torque Te* of the engine 22 to stop the engine 22 (step S150) and sets the value '0' to a torque command Tm1* to be output from the motor MG1 (step S160).

Figure 5:
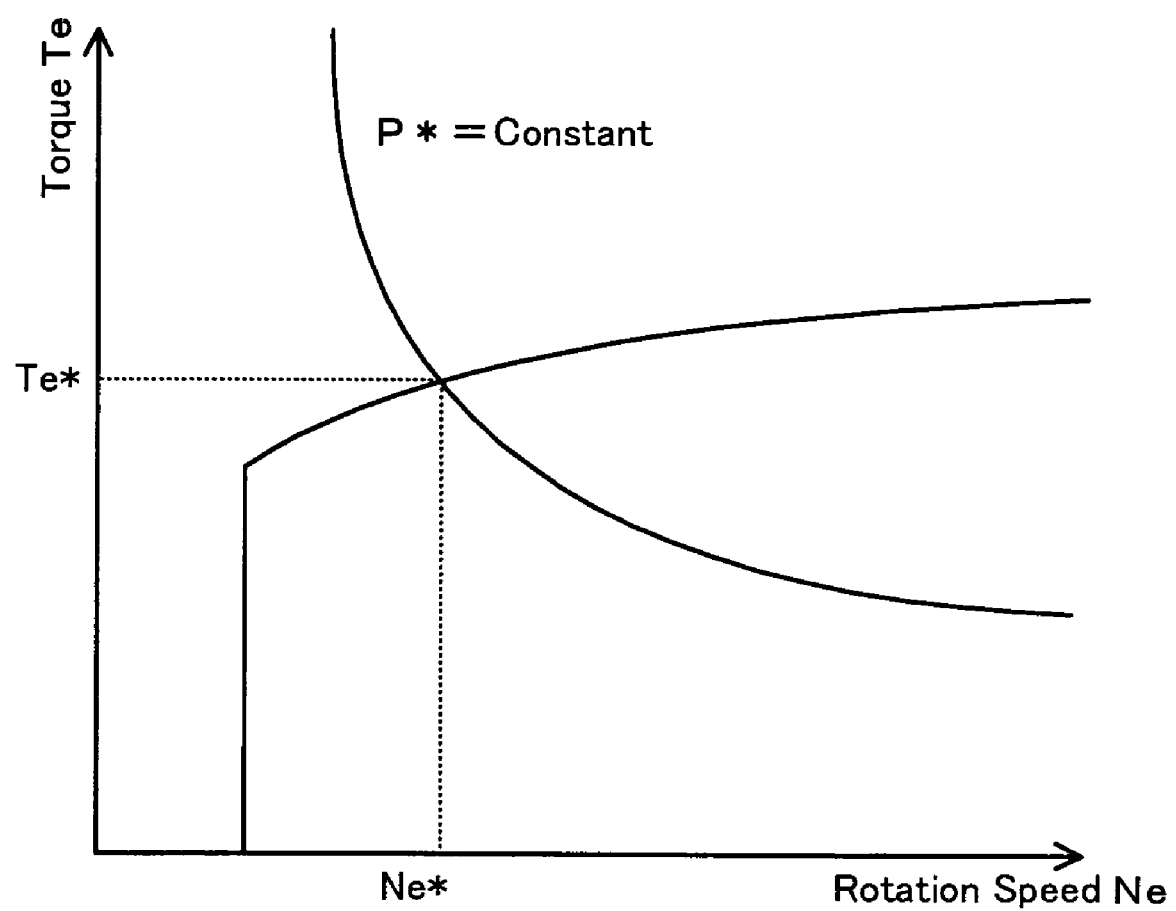
FIG. 5 shows an efficient operation line of an engine to set a target rotation speed Ne* and a target torque Te*.

When the calculated power demand P* is equal to or higher than the preset reference power level Pref (in the case of an affirmative answer at step S140), on the other hand, the CPU 72 sets a target rotation speed Ne* and a target torque Te* of the engine 22 corresponding to the power demand P* (step S170). The target rotation speed Ne* and the target torque Te* of the engine 22 are determined according to an efficient operation line of ensuring efficient operations of the engine 22 and a curve of the power demand P*. FIG. 5 shows an efficient operation line of the engine 22 to set the target rotation speed Ne* and the target torque Te*. As clearly shown in FIG. 5, the target rotation speed Ne* and the target torque Te* are given as an intersection of the efficient operation line and a curve of constant power demand P* (=Ne*×Te*).

After setting the target rotation speed Ne* and the target torque Te* of the engine 22, the CPU 72 calculates a target rotation speed Nm1* of the motor MG1 from the target rotation speed Ne* of the engine 22, a rotation speed Nr (=Nm2/Ga, where Ga denotes a gear ratio of the reduction gear 35) of the ring gear shaft 32a, and a gear ratio ρ of the power distribution integration mechanism 30 according to Equation (1) given below, while calculating a torque command Tm1* of the motor MG1 from the calculated target rotation speed Nm1* and the current rotation speed Nm1 of the motor MG1 according to Equation (2) given below (step S180):

$$Nm1^* = (Ne^* \cdot (1+\rho) - Nm2/(Ga))/\rho \qquad (1)$$

$$Tm1^* = \text{Previous } Tm1^* + KP(Nm1^* - Nm1) + KI \int (Nm1^* - Nm1) dt \qquad (2)$$

Figure 6:
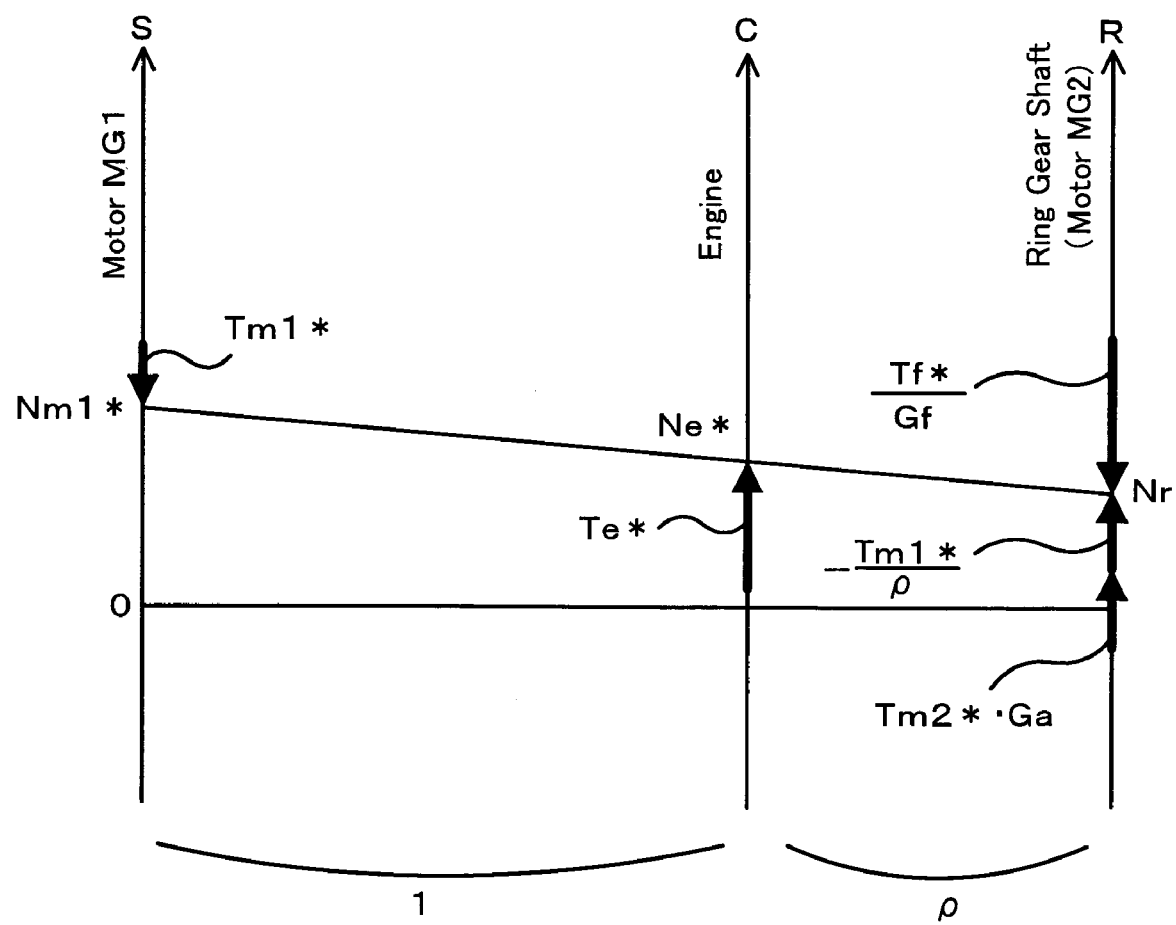
FIG. 6 is an alignment chart showing torque-rotation speed dynamics of respective rotation elements included in a power distribution integration mechanism in the hybrid vehicle of the embodiment.

FIG. 6 is an alignment chart showing torque-rotation speed dynamics of the respective rotation elements included in the power distribution integration mechanism 30. The left axis 'S' represents the rotation speed of the sun gear 31 that is equivalent to the rotation speed Nm1 of the motor MG1. The middle axis 'C' represents the rotation speed of the carrier 34 that is equivalent to the rotation speed Ne of the engine 22. The right axis 'R' represents the rotation speed Nr of the ring gear 32 (ring gear shaft 32a). The target rotation speed Nm1* of the motor MG1 is accordingly calculated from the rotation speed Nr of the ring gear shaft 32a, the target rotation speed Ne* of the engine 22, and the gear ratio ρ of the power distribution integration mechanism 30 according to Equation (1) given above. Drive control of the motor MG1 with the settings of the torque command Tm1* and the target rotation speed Nm1* enables rotation of the engine 22 at the target rotation speed Ne*. Equation (2) is a relational expression of feedback control to drive and rotate the motor MG1 at the target rotation speed Nm1*. In Equation (2) given above, 'KP' in the second term and 'KI' in the third term on the right side respectively denote a gain of the proportional and a gain of the integral term. Two upward thick arrows on the axis 'R' in FIG. 6 respectively show a torque that is transmitted to the ring gear shaft 32a when the torque Te* is output from the engine 22 in steady operation at a specific drive point of the target rotation speed Ne* and the target torque Te*, and a torque that is applied to the ring gear shaft 32a when a torque Tm2* is output from the motor MG2.

The CPU 72 sequentially calculates a torque command Tm2* to be output from the motor MG2 according to Equation (3) given below (step S190) and a torque command Tm3* to be output from the motor MG3 according to Equation (4) given below (step S200):

$$Tm2^* = (Tf^*/Gf + Tm1^*/\rho)/Ga \quad (3)$$

$$Tm3^* = Tr^*/Gr \quad (4)$$

The calculation of the torque command Tm2* subtracts a torque ($-Tm1^*/\rho$) directly transmitted from the engine 22 to the ring gear shaft 32a from division of the front wheel torque Tf* by a conversion factor Gf and further divides the result of the subtraction by the gear ratio Ga of the reduction gear 34. The calculation of the torque command Tm3* divides the rear wheel torque Tr* by a conversion factor Gr. The conversion factor Gf is used to convert the torque applied to the front wheels 62a and 62b into a torque applied to the ring gear shaft 32a. The conversion factor Gr is used to convert the torque applied to the rear wheels 64a and 64b into a torque applied to the motor MG3.

Figure 7:
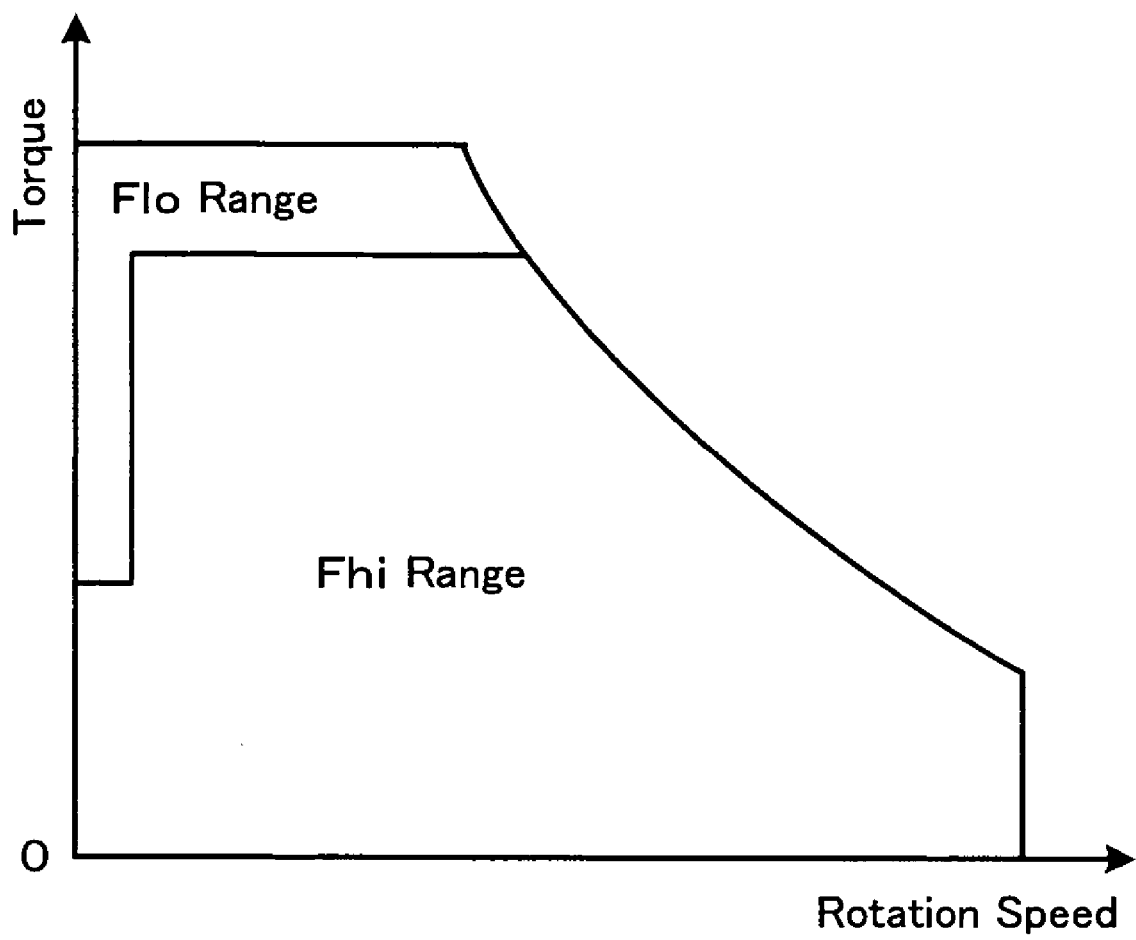
FIG. 7 shows one example of switching frequency setting maps.

Switching frequencies Fsw1, Fsw2, and Fsw3 of the six transistors T1 to T6 in the respective inverters 41, 42, and 43 are set corresponding to the torque commands Tm1*, Tm2*, and Tm3* and the current rotation speed Nm1, Nm2, and Nm3 of the motors MG1, MG2, and MG3 (step S210). A concrete procedure of setting the switching frequencies Fsw1, Fsw2, and Fsw3 in this embodiment stores in advance a variation in switching frequency Fsw1 against the torque command Tm1* and the rotation speed Nm1, a variation in switching frequency Fsw2 against the torque command Tm2* and the rotation speed Nm2, and a variation in switching frequency Fsw3 against the torque command Tm3* and the rotation speed Nm3 as switching frequency setting maps in the ROM 74. The procedure reads the switching frequencies Fsw1, Fsw2, and Fsw3 corresponding to the given torque commands Tm1*, Tm2*, and Tm3* and the given rotation speeds Nm1, Nm2, and Nm3 from the respective switching frequency setting maps. One example of the switching frequency setting maps is shown in FIG. 7. The switching frequency setting map of FIG. 7 is designed to set a low frequency Flo, for example, 2.5 kHz or 1.25 kHz, in an ultra low rotation speed range and a high torque range and to set a high frequency Fhi, for example, 5 kHz, in the residual range. The operation of the motor at the ultra low rotation speed causes the continuous flow of electric current through only a selected phase in the three-phase coils of the motor. The operation of the motor with the high torque causes the flow of large electric current. The inverters accordingly have a high potential of overheat in the ultra low rotation speed range and the high torque range.

After setting the switching frequencies Fsw1, Fsw2, and Fsw3, the CPU 72 determines whether the input inverter temperatures Tinv2 and Tinv3 are lower than a restriction start temperature (Tref−ΔT) that is lower by a preset temperature ΔT, for example, 10° C., than a frequency switchover temperature Tref, for example, 80° C. (steps S220 and S230). The frequency switchover temperature Tref represents a threshold level to restrict the switching frequencies Fsw2 and Fsw3 to the low frequency Flo for prevention of overheat of the inverters 42 and 43, irrespective of the settings at step S210. The frequency switching temperature Tref depends upon the performances of the inverters 42 and 43 and the cooling performances of cooling systems (not shown) to cool down the inverters 42 and 43. When both of the input inverter temperatures Tinv2 and Tinv3 are lower than the restriction start temperature (Tref−ΔT) (in the case of affirmative answers at both steps S220 and S230), the CPU 72 sends the target rotation speed Ne* and the target torque Te* of the engine 22 to the engine ECU 24 and sends the torque commands Tm1*, Tm2*, and Tm3* of the motors MG1, MG2, and MG3 and the switching frequencies Fsw1, Fsw2, and Fsw3 of the inverters 41, 42, and 43 to the motor ECU 40 (step S240). The CPU 72 then exits from this drive control routine of FIG. 3. The engine ECU 24 receives the target rotation speed Ne* and the target torque Te* and performs intake air flow regulation, fuel injection control, and ignition control to drive the engine 22 at the specified drive point of the received target rotation speed Ne* and the received target torque Te*. The motor ECU 40 receives the torque commands Tm1*, Tm2*, and Tm3* and the switching frequencies Fsw1, Fsw2, and Fsw3 and performs switching control of the transistors T1 to T6 in the respective inverters 41, 42, and 43 at the received switching frequencies Fsw1, Fsw2, and Fsw3 to ensure output of torques equivalent to the received torque commands Tm1*, Tm2*, and Tm3* from the motors MG1, MG2, and MG3. When either of the input inverter temperatures Tinv2 and Tinv3 is not lower than the restriction start temperature (Tref−ΔT) (in the case of a negative answer at either step S220 or step S230), on the other hand, the CPU 72 performs an overheat prevention process to prevent overheat of the inverter 42 or 43, which is heated to or over the restriction start temperature (Tref−ΔT) (step S250). The CPU 72 then sends the setting values to the engine ECU 24 and the motor ECU 40 and exits from this drive control routine of FIG. 3. The details of the overheat prevention process are described below with reference to the flowchart of FIG. 8.

Figure 8:
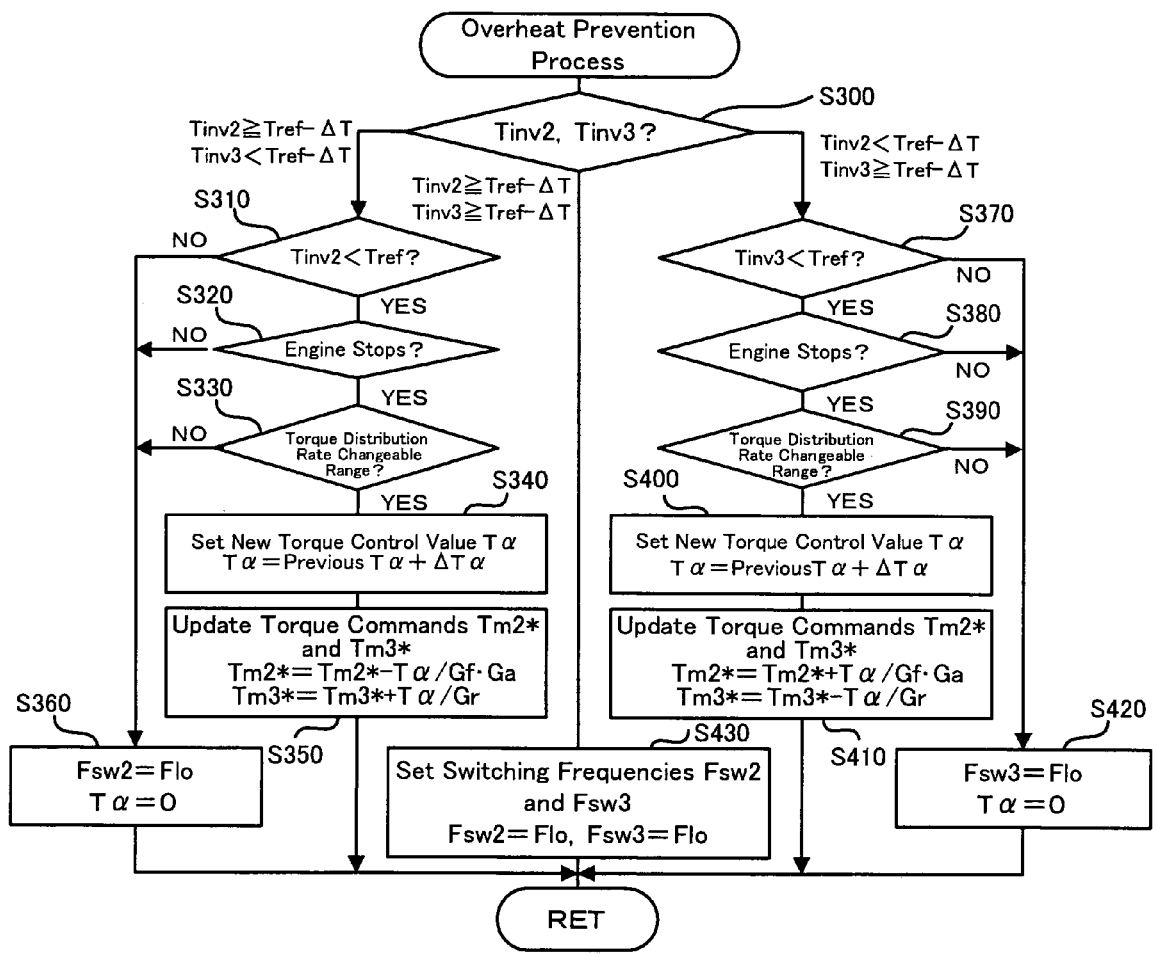
FIG. 8 is a flowchart showing the details of the overheat prevention process executed at step S250 in the flowchart of FIG. 3.

In the overheat prevention process of FIG. 8, the CPU 72 first identifies the levels of the inverter temperatures Tinv2 and Tinv3 (step S300). When the inverter temperature Tinv2 is not lower than the restriction start temperature (Tref−ΔT) but the inverter temperature Tinv3 is lower than the restriction start temperature (Tref−ΔT), the CPU 72 successively determines whether the inverter temperature Tinv2 is lower than the frequency switchover temperature Tref (step S310), whether the engine 22 stops operation (step S320), and whether the combination of the torque command Tm2* and the rotation speed Nm2 of the motor MG2 and the combination of the torque command Tm3* and the rotation speed Nm3 of the motor MG3 set in the drive control routine of FIG. 3 are both within a torque distribution rate changeable range shown in FIG. 9 (step S330). In the case of affirmative answers at all steps S310, S320, and S330, the CPU 72 adds a preset value ΔTα to a previous torque control value Tα set in a previous cycle of this overheat prevention routine to set a new torque control value Tα (step S340). The CPU 72 then subtracts the division of the new torque control value Tα by the product Gf·Ga of the conversion factor Gf and the gear ratio Ga from the current torque command Tm2* to update the torque command Tm2*, while adding the division of the new torque control value Tα by the conversion factor Gr to the current torque command Tm3* to update the torque command Tm3* (step S350). The calculations for updating the torque commands Tm2* and Tm3* follow Equations (5) and (6) given below:

$$Tm2^* = Tm2^* - T\alpha/Gf \cdot Ga \quad (5)$$

$$Tm3^* = Tm3^* + T\alpha/Gr \quad (6)$$

The CPU 72 then exits from the overheat prevention process of FIG. 8 and goes back to the drive control routine of FIG. 3. In the case of a negative answer at any of steps S310, S320, and S330, on the other hand, the CPU 72 sets the switching frequency Fsw2, which is previously set at step S210 in the drive control routine of FIG. 3, to the low frequency Flo and resets the torque control value Tα to '0' (step S360). The CPU 72 then exits from the overheat prevention process of FIG. 8 and goes back to the drive control routine of FIG. 3. When the inverter temperature Tinv2 reaches the restriction start temperature (Tref–ΔT), which is lower than the frequency switchover temperature Tref, the overheat prevention process gradually decreases the output torque of the motor MG2, simultaneously with a gradual increase of the output torque of the motor MG3. Such torque control relieves the load of the inverter 42, while satisfying the torque demand T*. When the inverter temperature Tinv2 reaches the frequency switchover temperature Tref, the overheat prevention process sets the switching frequency Fsw2 of the inverter 42 to the low frequency Flo and thereby decreases the on-off frequency of the transistors T1 to T6 in the inverter 42 per unit time. The decreased on-off frequency effectively relieves the load of the inverter 42 and prevents overheat of the inverter 42. The restriction of the output torque of the motor MG2 is performed, prior to the restriction of the switching frequency Fsw2 of the inverter 42. Such control desirably relieves the load of the inverter 42 and decreases the frequency of setting the switching frequency Fsw2 of the inverter 42 to the low frequency Flo, thus reducing the switching-induced electromagnetic noise. Namely the overheat prevention process effectively achieves both prevention of overheat of the inverter 42 and the relative quietness. When either the combination of the torque command Tm2* and the rotation speed Nm2 of the motor MG2 or the combination of the torque command Tm3* and the rotation speed Nm3 of the motor MG3 is out of the torque distribution rate changeable range shown in FIG. 9 (in the case of a negative answer at step S330), the overheat prevention process sets the switching frequency Fsw2 to the low frequency Flo at step S360. This setting of the switching frequency Fsw2 prevents an excess load from being applied to the inverter 43 by the decrease of the output torque of the motor MG2 and the simultaneous increase of the output torque of the motor MG3. The overheat prevention process also sets the switching frequency Fsw2 to the low frequency Flo when the inverter temperature Tinv2 reaches or exceeds the restriction start temperature (Tref–ΔT) under operation of the engine 22. This is because the operation noise of the engine 22 reduces the effects of the switching noise of the inverter 42.

Figure 9:
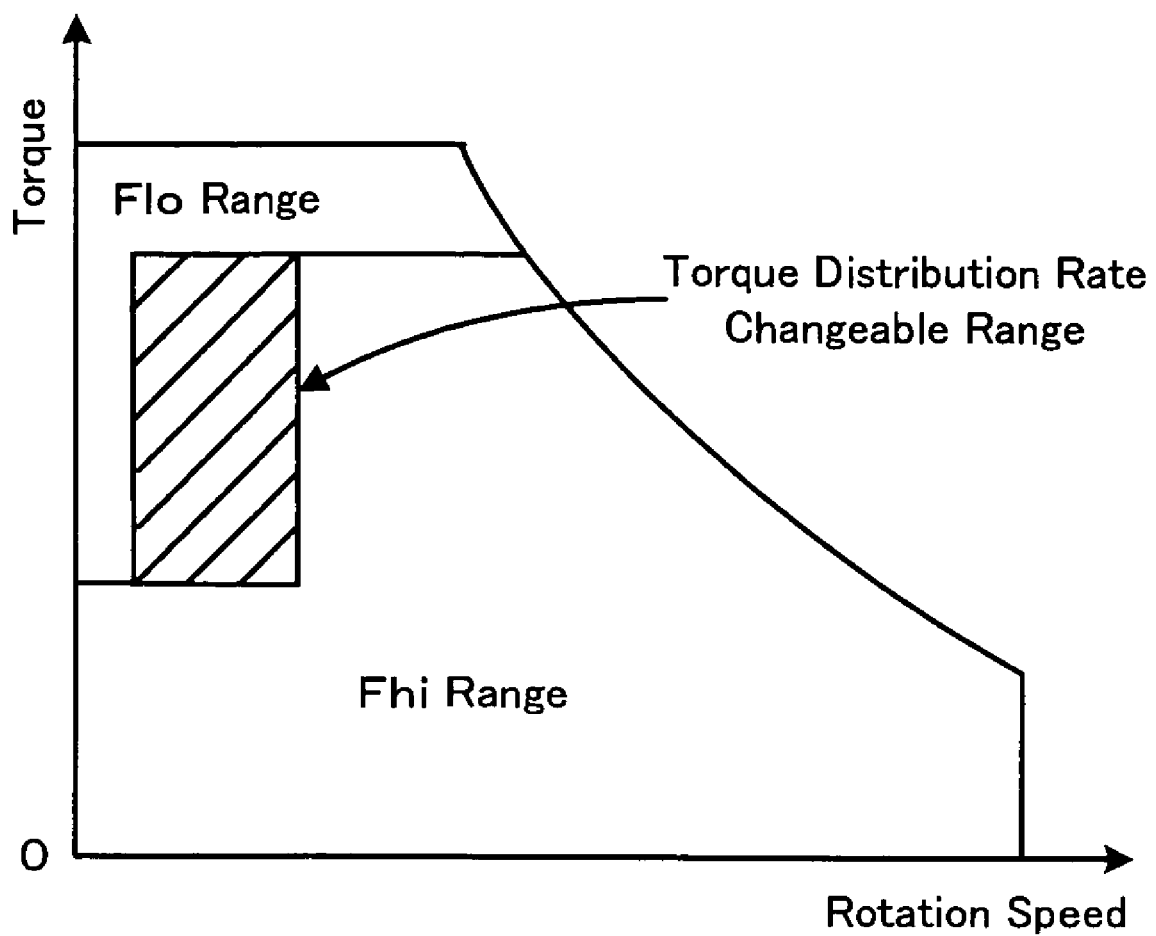
FIG. 9 shows one example of a torque distribution rate changeable range.

When the inverter temperature Tinv2 is lower than the restriction start temperature (Tref–ΔT) but the inverter temperature Tinv3 is not lower than the restriction start temperature (Tref–ΔT), the CPU 72 successively determines whether the inverter temperature Tinv3 is lower than the frequency switchover temperature Tref (step S370), whether the engine 22 stops operation (step S380), and whether the combination of the torque command Tm2* and the rotation speed Nm2 of the motor MG2 and the combination of the torque command Tm3* and the rotation speed Nm3 of the motor MG3 set in the drive control routine of FIG. 3 are both within the torque distribution rate changeable range shown in FIG. 9 (step S390). The processing of steps S370 to S390 is equivalent to the processing of steps S310 to S330 described above. In the case of affirmative answers at all steps S370, S380, and S390, the CPU 72 adds the preset value ΔTα to the previous torque control value Tα set in a previous cycle of this overheat prevention routine to set the new torque control value Tα (step S400). The CPU 72 then adds the division of the new torque control value Tα by the product Gf·Ga of the conversion factor Gf and the gear ratio Ga to the current torque command Tm2* to update the torque command Tm2*, while subtracting the division of the new torque control value Tα by the conversion factor Gr from the current torque command Tm3* to update the torque command Tm3* (step S410). The calculations for updating the torque commands Tm2* and Tm3* follow Equations (7) and (8) given below:

$$Tm2^* = Tm2^* + T\alpha/Gf \cdot Ga \quad (7)$$

$$Tm3^* = Tm3^* - T\alpha/Gr \quad (8)$$

The CPU 72 then exits from the overheat prevention process of FIG. 8 and goes back to the drive control routine of FIG. 3. In the case of a negative answer at any of steps S370, S380, and S390, on the other hand, the CPU 72 sets the switching frequency Fsw3, which is previously set at step S210 in the drive control routine of FIG. 3, to the low frequency Flo and resets the torque control value Tα to '0' (step S420). The CPU 72 then exits from the overheat prevention process of FIG. 8 and goes back to the drive control routine of FIG. 3.

When both the inverter temperatures Tinv2 and Tinv3 are equal to or over the restriction start temperature (Tref–ΔT), the CPU 72 sets both the switching frequencies Fsw2 and Fsw3, which are previously set at step S210 in the drive control routine of FIG. 3, to the low frequency Flo (step S430). The CPU 72 then exits from the overheat prevention process of FIG. 8 and goes back to the drive control routine of FIG. 3. When, both the inverter temperatures Tinv2 and Tinv3 reach or exceed the restriction start temperature (Tref–ΔT), it is unpractical to decrease the output torque of one motor and increase the output torque of the other motor. Setting both the switching frequencies Fsw2 and Fsw3 to the low frequency Flo effectively prevents overheat of both the inverters 42 and 43.

Figure 10:
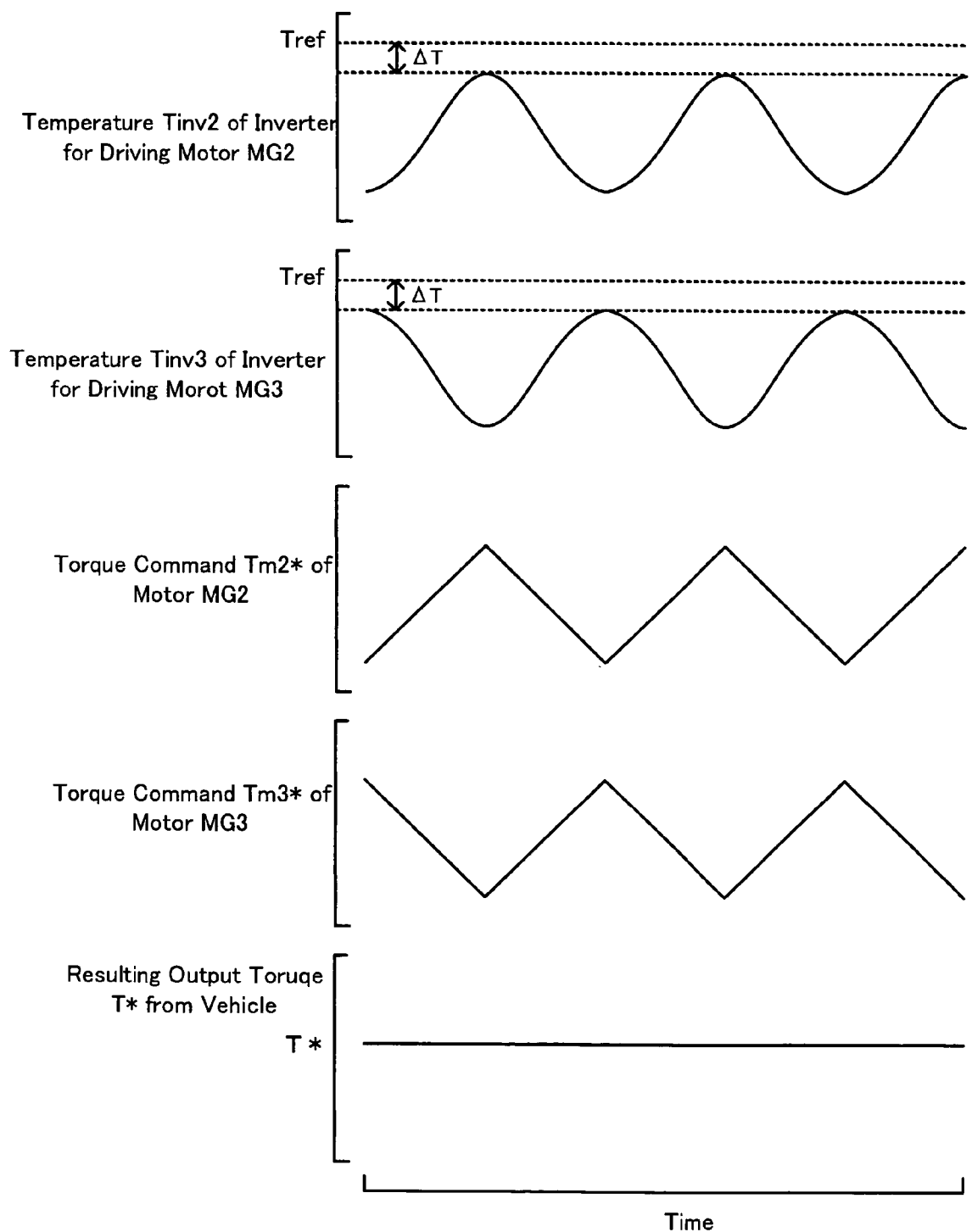
FIG. 10 shows time variations in inverter temperatures Tinv2 and Tinv3, in torque command Tm2* and Tm3* of motors MG2 and MG3, and in resulting output torque T* from the hybrid vehicle.

FIG. 10 shows time variations of the inverter temperatures Tinv2 and Tinv3, the torque command Tm2* and Tm3* of the motors MG2 and MG3, and a resulting output torque T* from the hybrid vehicle 20. As illustrated, when the inverter temperature Tinv2 of the inverter 42 for driving the motor MG2 reaches or exceeds the restriction start temperature (Tref–ΔT), the drive control of the embodiment gradually decreases the torque command Tm2* of the motor MG2, simultaneously with a gradual increase of the torque command Tm3* of the motor MG3. Such torque control effectively relieves the load of the inverter 42, while ensuring output of the torque demand T*. This torque control lowers the temperature of the inverter 42, but increases the load of the inverter 43 for driving the motor MG3 to raise the inverter temperature Tinv3 of the inverter 43. When the inverter temperature Tinv3 reaches or exceeds the restriction start temperature (Tref–ΔT), on the contrary, the drive control of the embodiment gradually decreases the torque command Tm3* of the motor MG3, simultaneously with a gradual increase of the torque command Tm2* of the motor MG2. Such torque control effectively relieves the load of the inverter 43, while ensuring output of the torque demand T*.

In the hybrid vehicle 20 of the embodiment described above, when the inverter temperature Tinv2 of the inverter 42 for driving the motor MG2 reaches or exceeds the restriction start temperature (Tref−ΔT), the drive control restricts the output torque of the motor MG2 and controls the operations of the inverters 42 and 43 to ensure output of the torque demand T*. When the inverter temperature Tinv2 reaches or exceeds the frequency switchover temperature Tref, the drive control sets the switching frequency Fsw2 of the inverter 42 to the low frequency Flo and controls the operations of the inverters 42 and 43 to ensure output of the torque demand T*. The restriction of the output torque of the motor MG2 is performed, prior to the restriction of the switching frequency Fsw2 of the inverter 42. Such control relieves the load of the inverter 42, while decreasing the frequency of lowering the switching frequency Fsw2 of the transistors T1 to T6 in the inverter 42 to reduce the switching noise. This arrangement desirably attains both prevention of overheat of the inverter 42 and the relative quietness, while ensuring output of the torque demand T*. When the operation of either the motor MG2 or the motor MG3 is out of the torque distribution rate changeable range shown in FIG. 9, the drive control sets the switching frequency Fsw2 of the inverter 42 to the low frequency Flo, instead of the restriction of the output torque of the motor MG2. This effectively prevents an excess load from being applied to the inverter 43. Under operation of the engine 22, the drive control also sets the switching frequency Fsw2 of the inverter 42 to the low frequency Flo, instead of the restriction of the output torque of the motor MG2. When the operation noise of the engine 22 reduces the effects of the switching noise of the transistors T1 to T6 in the inverter 42, the simpler setting sufficiently prevents overheat of the inverter 42. Such drive control is also applied to the inverter 43 to attain both prevention of overheat of the inverter 43 and the relative quietness.

In the hybrid vehicle 20 of the embodiment, the drive control routine sets the switching frequencies Fsw1, Fsw2, and Fsw3 of the inverters 41, 42, and 43 based on the operation points (defined by the torques and the rotation speeds) of the motors MG1, MG2, and MG3. The switching frequencies Fsw1, Fsw2, and Fsw3 may be set, regardless of the operation points of the motors MG1, MG2, and MG3.

The hybrid vehicle 20 of the embodiment performs the overheat prevention process, based on the inverter temperatures Tinv2 and Tinv3 measured by the temperature sensors 42a and 43a. The overheat prevention process may alternatively be performed, based on the electric currents flowing through the inverters 42 and 43. For example, the overheat prevention process may determine whether the electric currents of or over a preset level flow through the inverters 42 and 43 for a predetermined time period and change the processing flow based on the result of the determination.

In the hybrid vehicle 20 of the embodiment, the frequency switchover temperature Tref and the restriction start temperature (Tref−ΔT) are set to the fixed values for both the inverter temperatures Tinv2 and Tinv3. Different frequency switchover temperatures Tref and different restriction start temperatures (Tref−ΔT) may be used for the inverter temperatures Tinv2 and Tinv3.

In the hybrid vehicle 20 of the embodiment, in the case of affirmative answers at all steps S310 to S330 in the flowchart of FIG. 8, the overheat prevention process decreases the output torque of the motor MG2 driven by the inverter 42, simultaneously with an increase of the output torque of the motor MG3. In the case of a negative answer at any of steps S310 to S330, the overheat prevention process sets the switching frequency Fsw2 of the transistors T1 to T6 in the inverter 42 to the low frequency Flo. One modified procedure may decrease the output torque of the motor MG2 simultaneously with an increase of the output torque of the motor MG3 in the torque distribution rate changeable range, in addition to setting the switching frequency Fsw2 to the low frequency Flo. Such modification is also applicable to the overheat prevention process for the inverter 43.

In the hybrid vehicle 20 of the embodiment, when the engine 22 is under operation at step S320 in the flowchart of FIG. 8, the overheat prevention process sets the switching frequency Fsw2 to the low frequency Flo. One modified procedure may decrease the output torque of the motor MG2 simultaneously with an increase of the output torque of the motor MG3 without setting the switching frequency Fsw2 to the low frequency Flo. Such modification is also applicable to the overheat prevention process for the inverter 43.

In the hybrid vehicle 20 of the embodiment, the overheat prevention process shown in the flowchart of FIG. 8 gradually decreases the output torque of the motor MG2, simultaneously with a gradual increase of the output torque of the motor MG3 at step S350. One possible modification may abruptly decrease the output torque of the motor MG2, simultaneously with an abrupt increase of the output torque of the motor MG3. Such modification is also applicable to the overheat prevention process for the inverter 43.

In the hybrid vehicle 20 of the embodiment, the motors MG1, MG2, and MG3 constructed as synchronous motor generators are driven by the respective inverters 41, 42, and 43. This configuration is, however, not essential. The hybrid vehicle may have dc motors driven by respective chopper circuits.

In the hybrid vehicle 20 of the embodiment, the power of the engine 22 is output to the front wheels 62a and 62b. The power of the engine 22 may alternatively be output to the rear wheels 64a and 64b.

Figure 11:
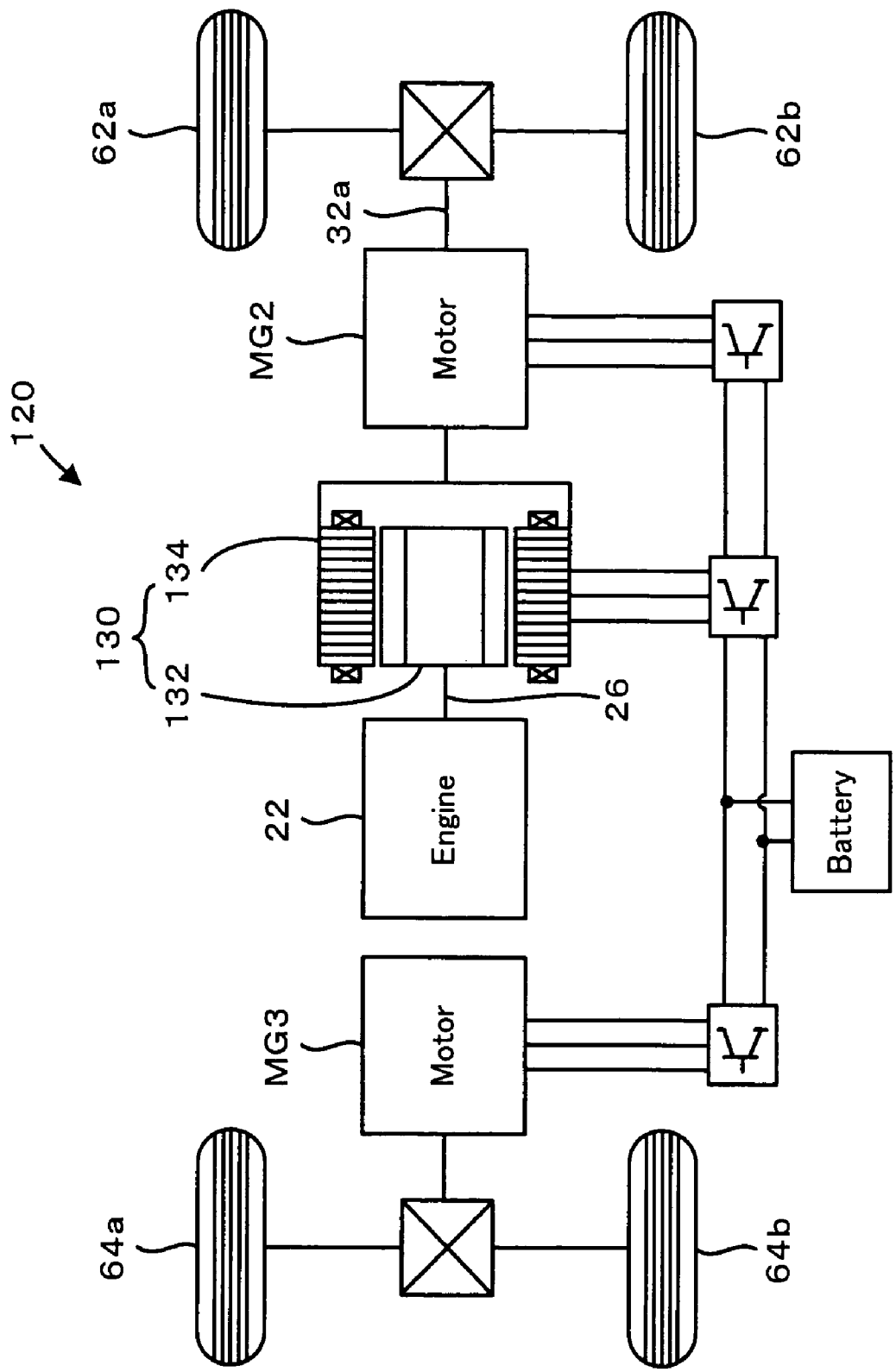
FIG. 11 schematically illustrates the configuration of another hybrid vehicle as one modified example.

In the hybrid vehicle 20 of the embodiment, the power of the engine 22 is output via the power distribution integration mechanism 30 to the ring gear shaft 32a or the drive shaft connected to the front wheels 62a and 62b. Application of the power output apparatus of the invention is, however, not restricted to the hybrid vehicle of this configuration. The principle of the invention is also applicable to a hybrid vehicle 120 shown in FIG. 11. The hybrid vehicle 120 of FIG. 11 has a pair-rotor motor 130 including an inner rotor 132 connected to the crankshaft 26 of the engine 22 and an outer rotor 134 connected to the drive shaft 32a for output of the power to the front wheels 62a and 62b. The pair-rotor motor 130 transmits part of the output power of the engine 22 to the drive shaft 32a, while converting the residual engine output power into electric power.

Figure 12:
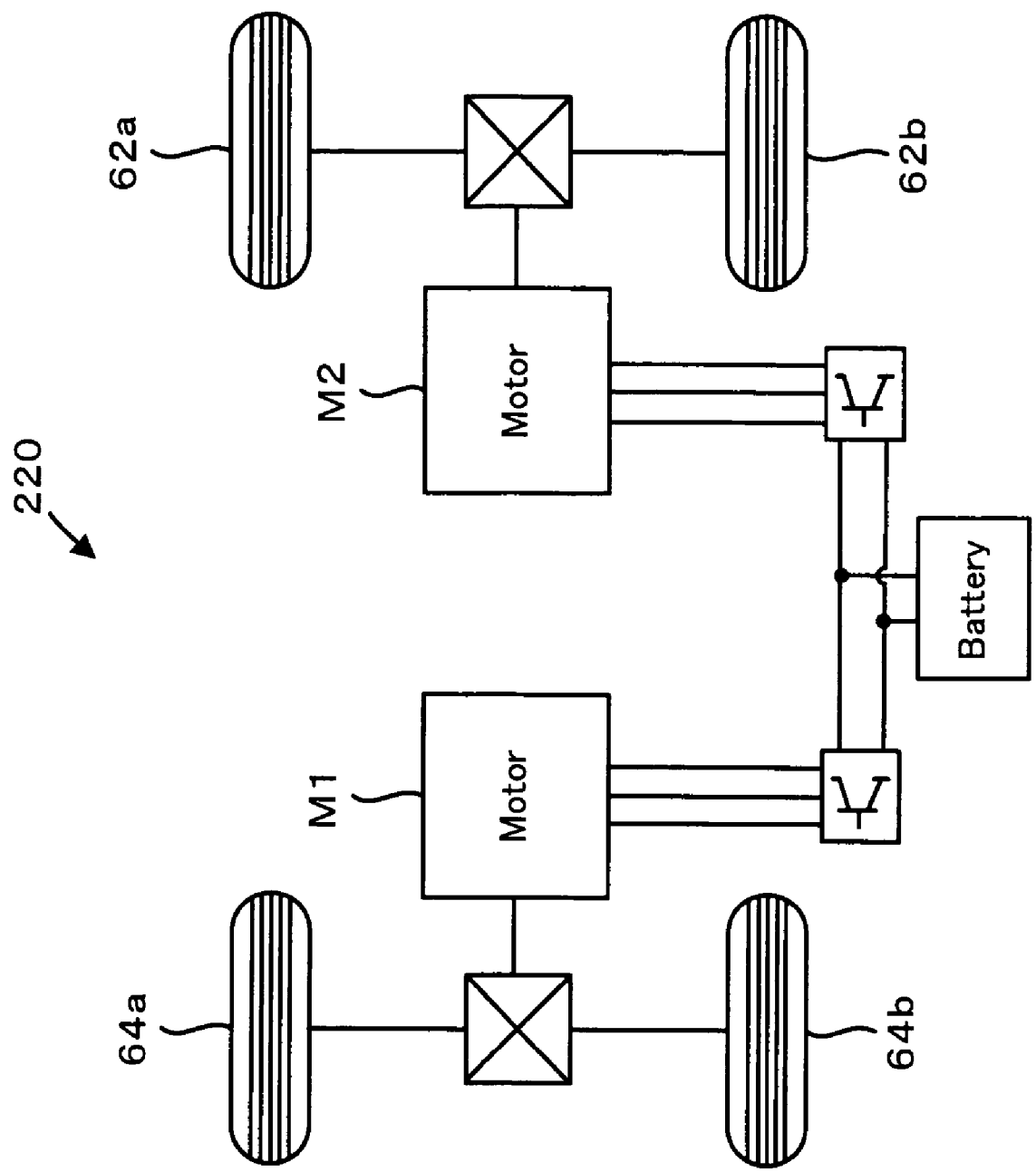
FIG. 12 schematically illustrates the configuration of an electric vehicle as another modified example.

The embodiment regards the power output apparatus mounted on the hybrid vehicle 20 having the engine 22 and the three motors MG1, MG2, and MG3 driven by the inverters 41 and 42 and 43. Application of the power output apparatus of the invention is, however, not restricted to such hybrid vehicles. The principle of the invention is also applicable to, for example, an electric vehicle 220 as a modified example shown in FIG. 12, which does not have an engine and is equipped with a motor M1 to output the power to the front wheels 62a and 62b and a motor M2 to output the power to the rear wheels 64a and 64b.

The power output apparatus of the invention may be mounted on any of motor vehicles, other vehicles like trains, and various moving bodies including aircraft and ships and boats.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

The invention claimed is:

1. A power output apparatus that outputs power for driving, said power output apparatus comprising:
    multiple motors that are capable of outputting power for driving;
    multiple driving circuits that individually have switching elements and respectively drive the multiple motors by switching operations of the switching elements;
    a power demand setting module that sets a power demand in response to an operator's operation; and
    a control module that, when all the multiple driving circuits are in a normal state, drives and controls the multiple driving circuits to ensure output of a power equivalent to the set power demand from the multiple motors,
    when one of the multiple driving circuits is in an abnormal state, said control module driving and controlling the multiple driving circuits to restrict output of the power from a motor driven by the driving circuit in the abnormal state, prior to restriction of a switching frequency of the switching elements included in the driving circuit in the abnormal state and to ensure output of the power equivalent to the set power demand from the multiple motors; and
    wherein said control module drives and controls a driving circuit heated to at least a preset first temperature among the multiple driving circuits, as the driving circuit in the abnormal state;
    wherein when one of the multiple driving circuits is heated to the preset first temperature, said control module drives and controls the multiple driving circuits to restrict output of the power from a motor driven by the driving circuit heated to the preset first temperature and to ensure output of the power equivalent to the set power demand from the multiple motors,
    when one of the multiple driving circuits is heated to a preset second temperature, which is higher than the preset first temperature, said control module driving and controlling the multiple driving circuits to restrict the switching frequency of the switching elements included in at least the driving circuit heated to the preset second temperature and to ensure output of the power equivalent to the set power demand from the multiple motors; and
    wherein said control module drives and controls the multiple driving circuits to enable a motor driven by a driving circuit in the normal state to compensate for an insufficiency of the power caused by the restriction of the output of the power from the motor driven by the driving circuit in the abnormal state.

2. A power output apparatus in accordance with claim 1, wherein said control module drives and controls the multiple driving circuits to gradually decrease the power output from the motor driven by the driving circuit in the abnormal state, simultaneously with a gradual increase in power output from the motor driven by the driving circuit in the normal state.

3. A power output apparatus in accordance with claim 1, wherein when the motor driven by the driving circuit in the normal state fails to compensate for the insufficiency of the power caused by the restriction of output of the power from the motor driven by the driving circuit in the abnormal state in a preset power range, said control module drives and controls the multiple driving circuits to restrict the switching frequency of the switching elements included in at least the driving circuit in the abnormal state and to ensure output of the power equivalent to the set power demand from the multiple motors.

4. A power output apparatus in accordance with claim 1, said power output apparatus further comprising:
    an internal combustion engine that outputs power for driving,
    wherein when one of the multiple driving circuits is in the abnormal state under operation of the internal combustion engine, said control module drives and controls the multiple driving circuits to restrict the switching frequency of the switching elements included in at least the driving circuit in the abnormal state and to ensure output of the power equivalent to the set power demand from the multiple motors.

5. A motor vehicle, said motor vehicle comprising:
    multiple motors including a first motor that is capable of outputting power to first wheels and a second motor that is capable of outputting power to second wheels, which are different from the first wheels;
    multiple driving circuits including a first driving circuit and a second driving circuit that individually have switching elements and respectively drive the first motor and the second motor by switching operations of the switching elements;
    a power demand setting module that sets a power demand in response to an operator's operation; and
    a control module that, when all the multiple driving circuits are in a normal state, drives and controls the multiple driving circuits to ensure output of a power equivalent to the set power demand from the multiple motors,
    when the first driving circuit among the multiple driving circuits is in an abnormal state, said control module driving and controlling the multiple driving circuits to restrict output of the power from the first motor driven by the first driving circuit, prior to restriction of a switching frequency of the switching elements included in the first driving circuit and to enable the second motor to compensate for an insufficiency of the power caused by the restriction, thus ensuring output of the power equivalent to the set power demand from the multiple motors; and
    wherein said control module drives and controls a driving circuit heated to at least a preset first temperature among the multiple driving circuits, as the driving circuit in the abnormal state;
    wherein when one of the multiple driving circuits is heated to the preset first temperature, said control module drives and controls the multiple driving circuits to restrict output of the power from a motor driven by the driving circuit heated to the preset first temperature and to ensure output of the power equivalent to the set power demand from the multiple motors,
    when one of the multiple driving circuits is heated to a preset second temperature, which is higher than the preset first temperature, said control module driving and controlling the multiple driving circuits to restrict the switching frequency of the switching elements included in at least the driving circuit heated to the preset second temperature and to ensure output of the power equivalent to the set power demand from the multiple motors; and wherein said control module drives and controls the multiple driving circuits to enable a motor driven by a driving circuit in the normal state to compensate for an insufficiency of the power caused by the restriction of the output of the power from the motor driven by the driving circuit in the abnormal state.

6. A control method of a power output apparatus, said power output apparatus comprising: multiple motors that are capable of outputting power for driving; and multiple driving circuits that individually have switching elements and respectively drive the multiple motors by switching operations of the switching elements, said control method comprising the steps of:

(a) setting a power demand in response to an operator's operation; and (b) when all the multiple driving circuits are in a normal state, driving and controlling the multiple driving circuits to ensure output of a power equivalent to the set power demand from the multiple motors, when one of the multiple driving circuits is in an abnormal state, driving and controlling the multiple driving circuits to restrict output of the power from a motor driven by the driving circuit in the abnormal state, prior to restriction of a switching frequency of the switching elements included in the driving circuit in the abnormal state and to ensure output of the power equivalent to the set power demand from the multiple motors; and wherein said step (b) drives and controls a driving circuit heated to at least a preset first temperature among the multiple driving circuits, as the driving circuit in the abnormal state;

wherein when one of the multiple driving circuits is heated to the preset first temperature, said step (b) drives and controls the multiple driving circuits to restrict output of the power from a motor driven by a driving circuit heated to the preset first temperature and to ensure output of the power equivalent to the set power demand from the multiple motors, when one of the multiple driving circuits is heated to a preset second temperature, which is higher than the preset first temperature, said step (b) drives and controls the multiple driving circuits to restrict the switching frequency of the switching elements included in at least the driving circuit heated to the preset second temperature and to ensure output of the power equivalent to the set power demand from the multiple motors;

wherein said step (b) drives and controls the multiple driving circuits to enable a motor driven by a driving circuit in the normal state to compensate for an insufficiency of the power caused by the restriction of the output of the power from the motor driven by the driving circuit in the abnormal state.

7. A control method in accordance with claim 6, wherein said step (b) drives and controls the multiple driving circuits to gradually decrease the power output from the motor driven by the driving circuit in the abnormal state, simultaneously with a gradual increase in power output from the motor driven by the driving circuit in the normal state.

8. A control method in accordance with claim 6, wherein when the motor driven by the driving circuit in the normal state fails to compensate for the insufficiency of the power caused by the restriction of output of the power from the motor driven by the driving circuit in the abnormal state in a preset power range, said step (b) drives and controls the multiple driving circuits to restrict the switching frequency of the switching elements included in at least the driving circuit in the abnormal state and to ensure output of the power equivalent to the set power demand from the multiple motors.

9. A control method in accordance with claim 6, wherein said power output apparatus comprises an internal combustion engine that outputs power for driving; and when one of the multiple driving circuits is in the abnormal state under operation of the internal combustion engine, said step (b) drives and controls the multiple driving circuits to restrict the switching frequency of the switching elements included in at least the driving circuit in the abnormal state and to ensure output of the power equivalent to the set power demand from the multiple motors.

* * * * *